INVENTOR.
EDWARD T. HOLLAND JR.
BY
Merchant, Merchant & Gould
ATTORNEYS

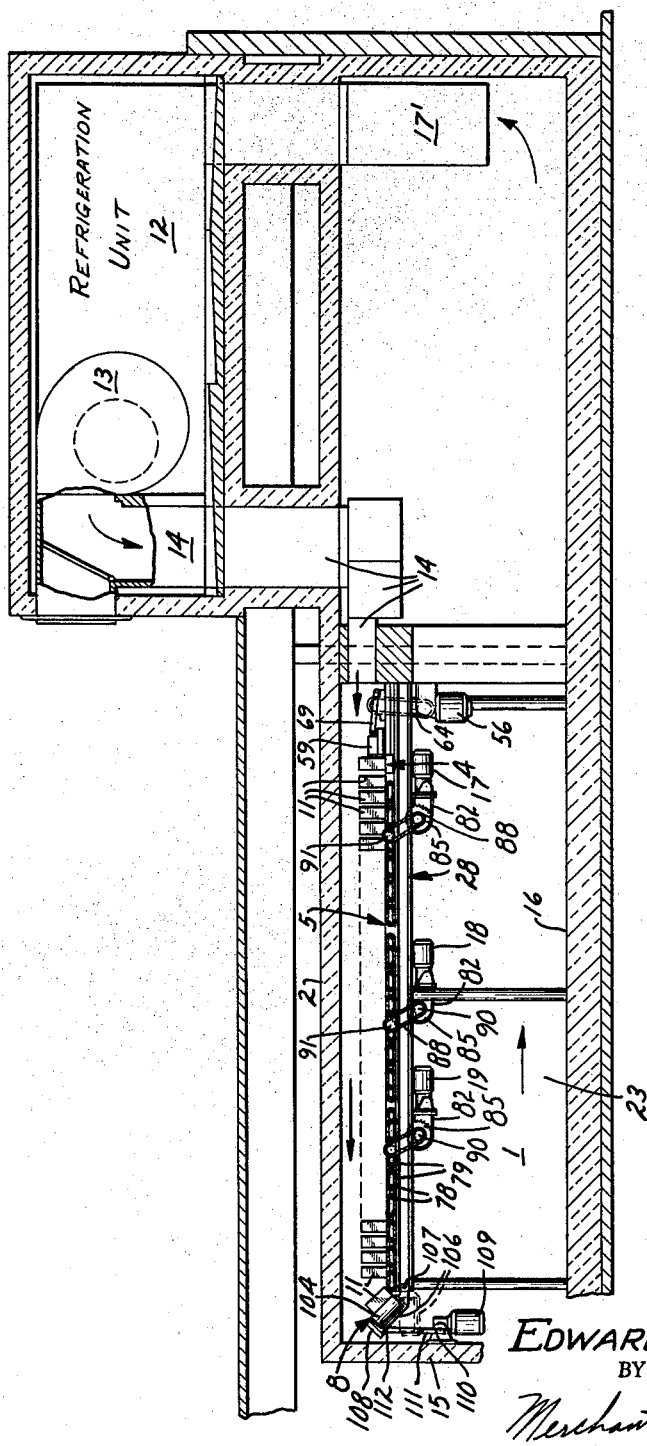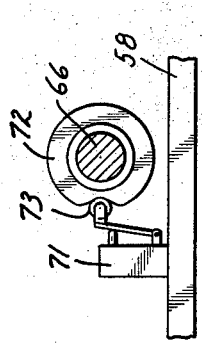

INVENTOR.
EDWARD T. HOLLAND JR.
BY
Merchant, Merchant & Gould
ATTORNEYS

INVENTOR.
EDWARD T. HOLLAND JR.
BY
Merchant, Merchant & Gould
ATTORNEYS

INVENTOR.
EDWARD T. HOLLAND JR.
BY
Merchant, Merchant & Gould
ATTORNEYS

June 15, 1965 E. T. HOLLAND, JR 3,189,160
ROLLER BED CONVEYOR
Filed May 31, 1963 7 Sheets-Sheet 6
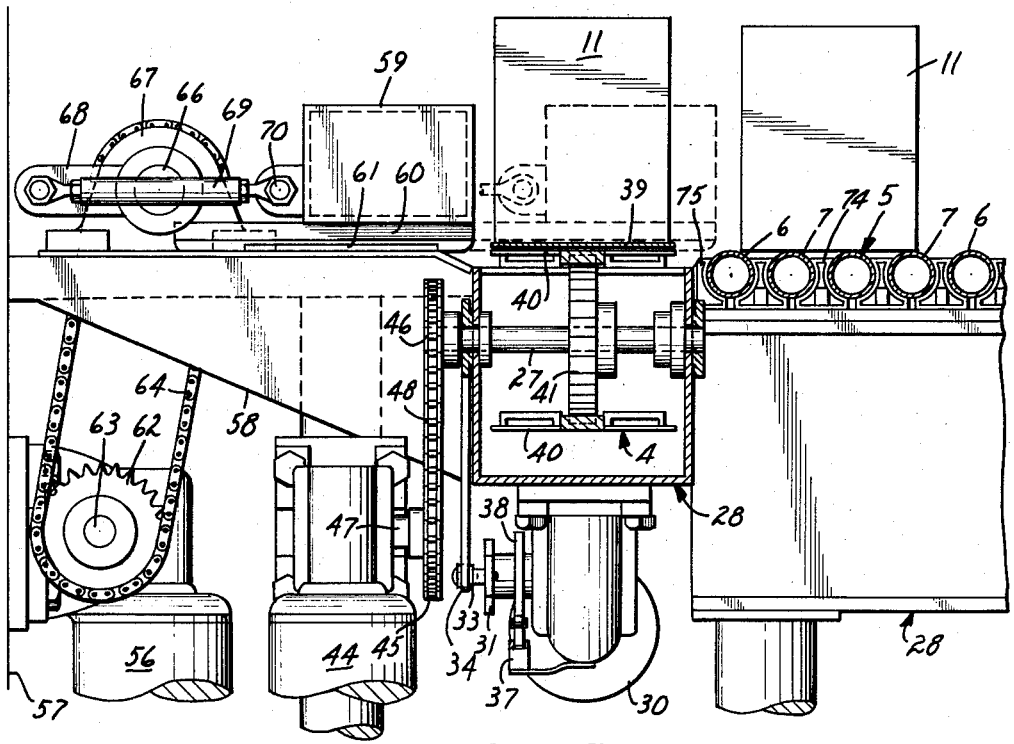
FIG. 7
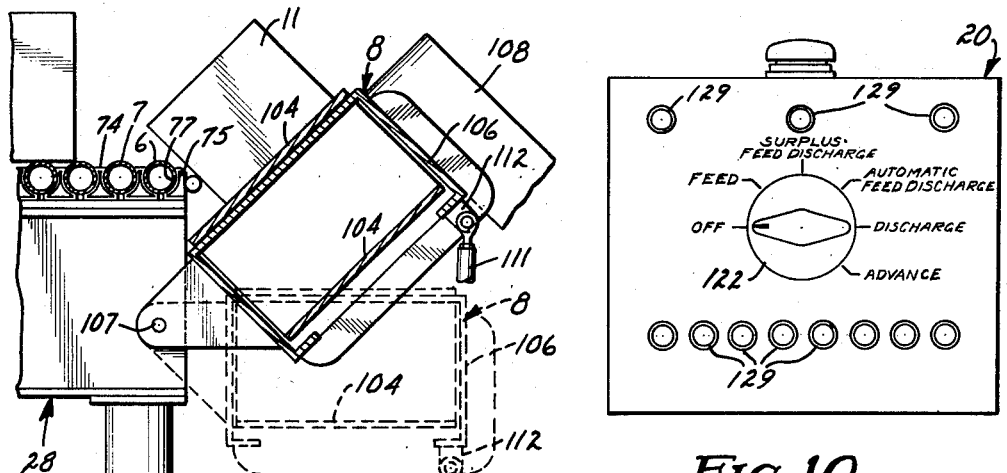
FIG. 8
FIG. 10
INVENTOR.
EDWARD T. HOLLAND JR.
BY
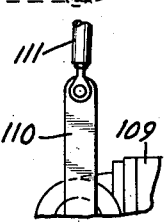
ATTORNEYS

United States Patent Office 3,189,160
Patented June 15, 1965

3,189,160
ROLLER BED CONVEYOR
Edward T. Holland, Jr., Lancaster, Pa., assignor to Daffin Corporation, Hopkins, Minn., a corporation of Delaware
Filed May 31, 1963, Ser. No. 284,565
8 Claims. (Cl. 198—37)

This invention relates to a roller bed conveyor, and more particularly, to a device which will convey a large quantity of product units through a processing stage at a low rate of speed.

More specifically, this invention relates to a roller bed conveyor system particularly adapted to be used in the cold storage room of an ice cream plant to carry out the hardening process of the product, but it will be understood that a conveyor of this type may be utilized in other processing operations which require a similar type of handling.

In the ice cream industry at the present time, the product in a relatively liquid or soft form is introduced into packages which are in turn moved into a cold storage room for freezing. It will be appreciated that an ice cream plant must handle thousands of packages per hour in this manner and that the very bulk of the product requires that it move rapidly and continuously throughout its manufacture and processing to a point where it may be stored or moved into the channels of distribution. In many plants, the packages are placed in metal containers which in turn are moved by conveyors into racks. These racks are frequently of such a nature as to require a great deal of space and must be unloaded manually under some conditions.

An important object of this invention is the provision of a bed of considerable area which may be installed relatively close to the ceiling of a cold storage room and to hold several thousand packages of the product, moving it slowly while processing, such as hardening, is taking place.

Another object of this invention is the provision of conveyor means to load products onto this storage area in an orderly manner.

A still further object of this invention is the provision of a sectionalized moving conveyor bed, whereby various portions thereof can be used in differing process steps simultaneously.

Another object of my invention is the provision of a system in which the movement of the product will both initiate and time the movement of the roller bed.

Another object of this invention is the provision of a device for removing the product from the roller bed conveyor in an orderly manner, and which includes control means for stopping the conveyor when the product is being removed.

A still further object of my invention is the provision of a device in which electrical control circuits can be set in a pre-selected program to govern the movement of the various portions of the conveyor system.

Another object of this invention is the provision of a device in which the rate of unloading will regulate the movement of the conveyor.

Another object of this invention is the provision of a roller bed conveyor having novel driving connections and novel bearing means for the several rollers of the conveyor bed.

The above, and still further highly important objects and advantages of this invention will become apparent to those skilled in the art upon a consideration of the accompanying drawings and following specification, wherein is disclosed a single exemplary embodiment of the invention.

Referring to the drawings, in which like reference characters indicate like parts throughout the several views:

FIG. 2 is a side view of the roller bed conveyor showing its relation to a sharp freezing unit in a freezing room, the freezing room being shown in vertical section;

FIG. 7 is an enlarged fragmentary view in end elevation as seen from line 7—7 of FIG. 6;

FIG. 8 is an enlarged fragmentary detail in section, taken on the line 8—8 of FIG. 1;

FIG. 9 is a fragmentary detail, partly in side elevation and partly in section, taken on the line 9—9 of FIG. 3;

FIG. 10 is a view in front elevation of a control panel by which movements of the conveyor and its separate portions are programmed.

Figure 1:
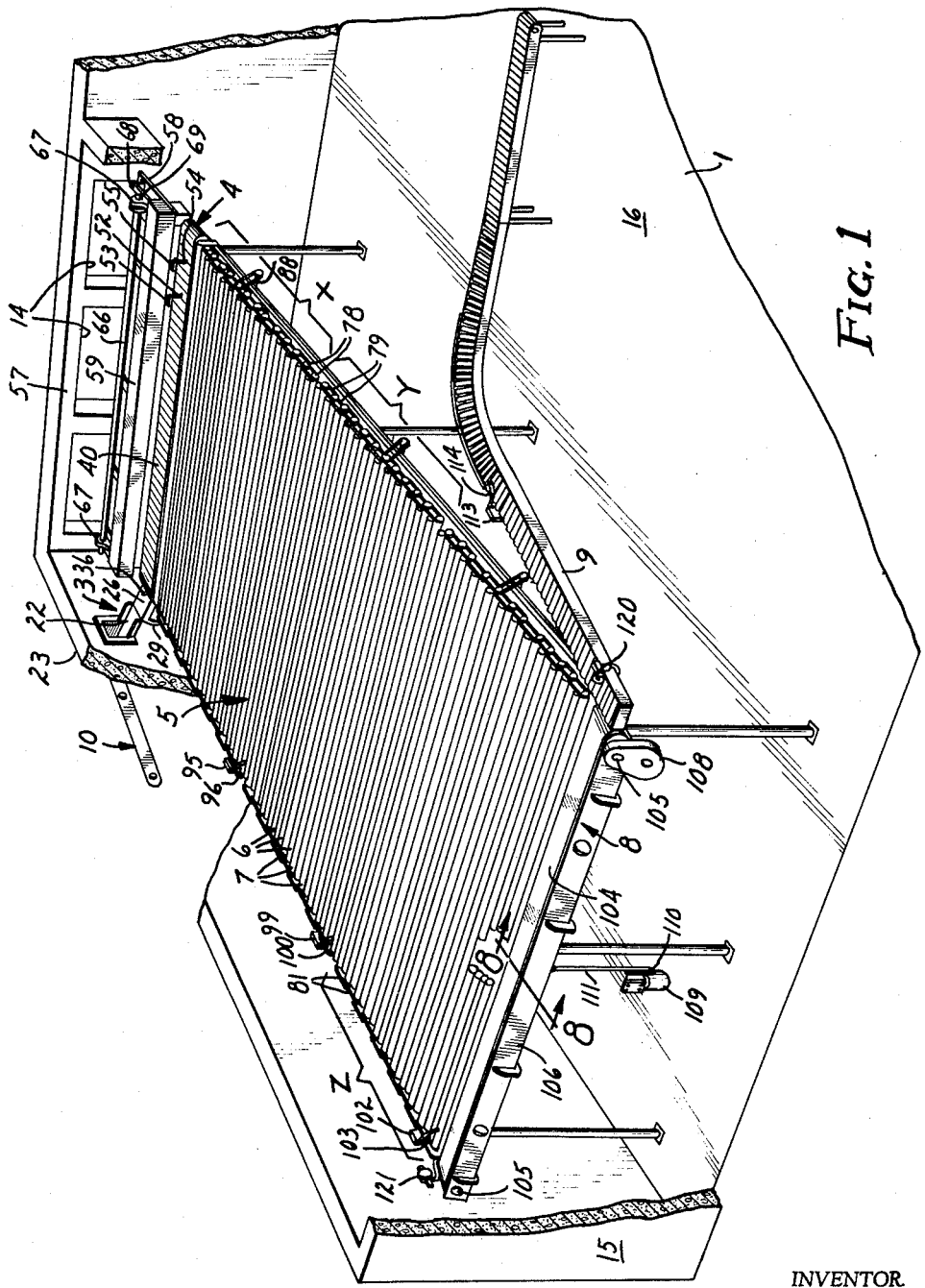
FIG. 1 is a view in perspective of a roller bed conveyor unit produced in accordance with this invention and installed in the freezing room of an ice cream plant.

Referring with greater detail to the drawings, a conveyor constructed according to my invention is shown as being installed in a cold storage and freezing room 1 in close proximity to the ceiling 2 thereof and comprises a plurality of inter-dependent functional sections hereinafter designated in the order in which the products reach these various sections.

An infeed chute and lifter mechanism 3 moves packaged products to a horizontal transverse conveyor 4 from which they are then moved at right angles on to a main roller bed 5 which is made up of a large number of individual rollers 6 and 7. The packages or articles are moved the length of the roller bed 5 to a discharge conveyor 8 which then moves the packages or articles at right angles to their previous direction of movement on the roller bed conveyor 5 into a chute 9 which delivers the articles to the floor level of the room 1 for storage.

When the packaged product reaches the inclined infeed conveyor 10 of the infeed and lifter mechanism 3, it is in substantially liquid or soft form in containers 11 which consist of several cartons, such as one-gallon cartons wrapped in a single package. The cold storage room 1 is chilled by a continuous movement of air which passes through a sharp freeze refrigerating unit 12, diagrammatically shown in FIG. 2, and is moved by a fan or blower 13 through duct work 14 to the space above the rolled bed 5. The chilled air flows along the ceiling 2 toward an end wall 15, downwardly toward the floor 16 of the room 1 and back toward a return duct or the like 17' to the refrigerating unit 12. When the product within the containers 11 is in its soft form, it is necessary that the individual containers 11 be spaced apart so that all of the surfaces will be exposed to the chilled air which is moving through the room. For this reason, the transverse conveyor 4 must deliver the containers onto the roller bed conveyor 5 in spaced relationship, which spaced relationship must be maintained on the roller bed 5. The containers 11 are moved longitudinally of the roller bed 5 at a relatively slow rate of speed, usually in stages and at about one foot per minute when the roller bed conveyor is operating. When the containers 11 reach the opposite or discharge end of the roller bed 5, they move onto the discharge chute 9 for delivery to the lower portion of the room 1, where the containers 11 containing the hardened products may be transferred to pallets or the like for storage or delivery.

In connection with the movement of packaged articles along the roller bed, it will be noted that such movement has been described as a more or less continuous operation. It is also desirable that the roller bed 5 be used for storage. For this reason, and for others which will be hereinafter described, the roller bed 5 is divided into separate sections X, Y, and Z, see FIG. 1. While but three roller bed sections are shown and described, it will be appreciated that any desired number of roller bed sections can be provided. Each of the roller bed sections X, Y, and Z is driven by a respective motor 17, 18 and 19, each of said motors having its separate control means to be described. With this arrangement, the first section X receives the product for hardening, the second section Y receives the product from the first section, and the third section Z receives the product from the second section and unloads the product for storage in the storage room 1 below the roller bed conveyor. Operation of the roller bed may be stopped at any time during the filling thereof, so that the product may be stored thereon for a desired period of time, or the bed may be automatically unloaded of previously stored product without newly packed product being fed thereto, provided the proper programming setting has been made on the control board shown in FIG. 10 and indicated in its entirety by the numeral 20. It will be further noted that movement of the product within the containers 11 is controlled entirely by speeds at which it is placed on the infeed mechanism 3 or, alternately by the speed with which it is removed from the discharge chute 9, and that any automatic timing throughout the system is provided only for the purpose of keeping the individual sections or conveyors in operation for only a short period of time.

Figure 6:
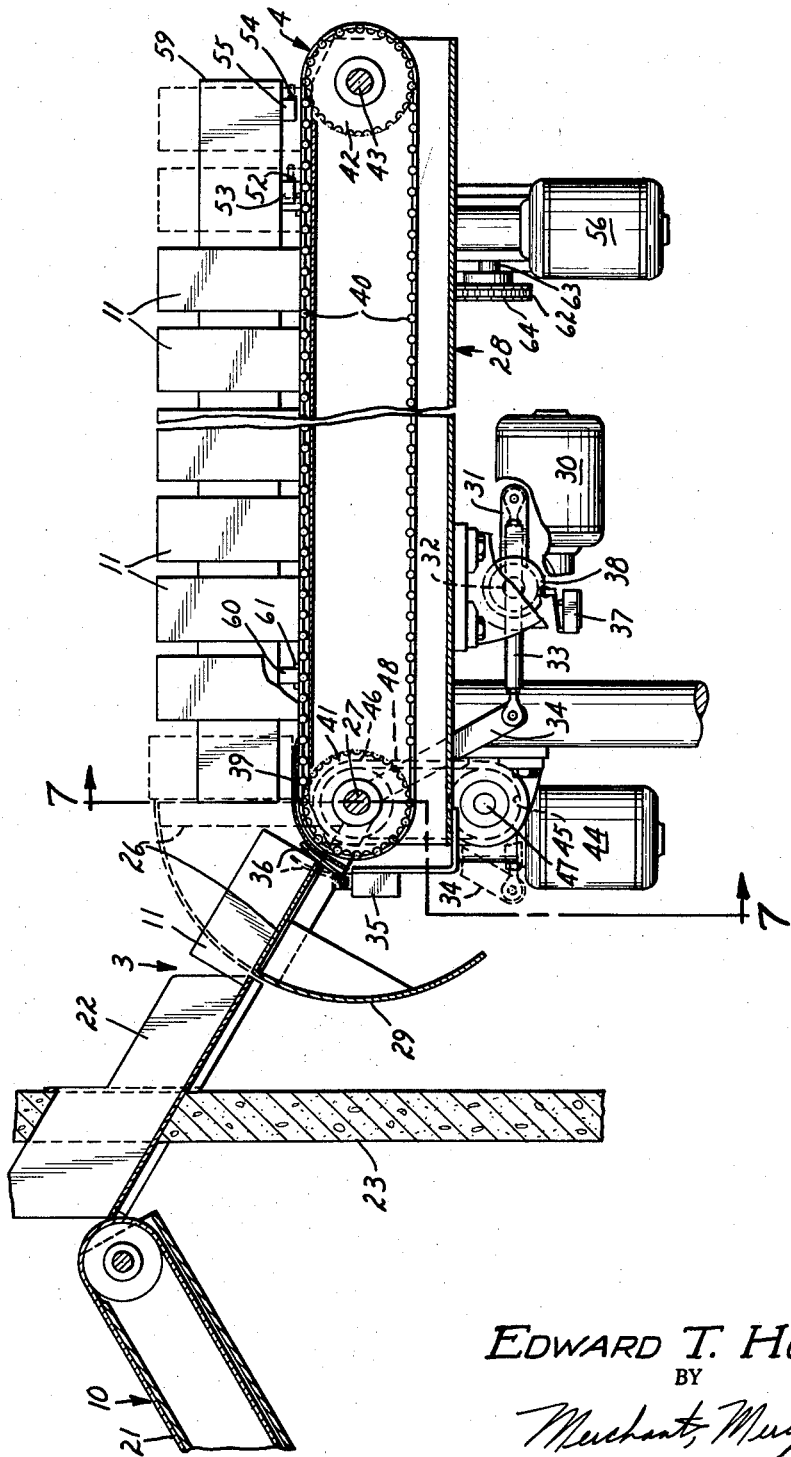
FIG. 6 is a fragmentary section taken substantially on the line 6—6 of FIG. 3.

Referring now to the individual sections or devices in order of their operation and handling of the containers 11, the infeed and lifter mechanism 3 will be first described. A primary conveyor, not shown, may be assumed to deliver the newly packaged product to a secondary endless belt conveyor 21, which is inclined upwardly to deliver the containers 11 to a chute 22 that extends through an opening in a side wall 23 of the hardening room 1. The primary conveyor, not shown, is adapted to be operated by a motor 24, the secondary conveyor 21 being operated by a motor 25, see FIG. 11. The infeed motors 24 and 25 deliver the packages 11 singly to the infeed chute 22, each package 11 sliding downwardly on the chute 22 and onto a lifter 26 that is pivotally mounted on a horizontally disposed shaft 27 journalled in frame structure 28 which supports the main roller bed 5, the shaft 27 extending longitudinally of the roller bed 5 and disposed adjacent the inlet end thereof. With reference to FIG. 6, it will be seen that the lifter 26 moves between a package receiving position shown by full lines and a package delivery position shown by dotted line, the packages 11 when moved by the lifter 26 to its package delivery position, being disposed vertically. The lifter 26 is provided with an arcuate plate-like member 29 disposed adjacent the discharge end of the chute 22 and which limits descending movement of packages on the chute 22 when the lifter 26 is moved upwardly away from its package receiving position shown by full lines in FIG. 6. The lifter 26 is moved between its package receiving and delivery positions by means of a motor 30, a crank 31 mounted on the output shaft 32 of the motor 30, a pitman arm 33 pivotally secured at one end to the radially outer end of the crank 31, and a second crank or rocker arm 34 pivotally secured at one end to the other end of the pitman arm 33 and operatively connected to the lifter 26 for common swinging movements therewith. During a single operating cycle, the lifter 26 moves from its full line position of FIG. 6 to the dotted line position thereof and back to said full line position, this cycle being accomplished by a single revolution of the output or drive shaft 32 of the motor 30. The motor 30 is energized by closing of a normally open switch 35 having a package engaging sensing finger 36, see FIGS. 6 and 11, the motor 30 being held energized for a single complete revolution of the output shaft 32 thereof by a holding switch 37 that is operated by a cam 38 mounted on the output shaft 32 of the motor 30.

As each container 11 is raised to a vertical position by the lifter 26, it comes to rest on a platform or the like 39 that overlies the inlet end of the transverse conveyor 4, the transverse conveyor 4 comprising an endless conveyor belt 40 that is entrained over a pair of spaced sprockets or pulleys 41 and 42, the former of which is mounted on the shaft 27 and the latter of which is mounted on a shaft 43 journalled in the frame structure 28 in spaced parallel relation to the sprocket 41. A drive motor 44 drives the transverse conveyor belt 40 by means of sprocket wheels 45 and 46 fast on the output shaft 47 of the motor 44 and on the shaft 27 respectively, and an endless link chain 48 entrained over the sprockets 45 and 46. The transverse conveyor drive motor 44 is energized by closing of a normally open switch 49 that is controlled by conventional starter mechanism, not shown, for the lifter motor 30, and which is disposed in a series circuit with the switch of a time delay relay 50 and switches 35 and 37. When a package 11 is moved off of the platform 39 and on to the upper flight of the transverse conveyor belt 40 by movement of a subsequent package 11 to the platform 39, the drive motor 44 for the transverse conveyor 4 will operate for a length of time to move the conveyor belt 40 a distance equal to the width of a container 11 plus a predetermined distance, such as one inch. The motor 44 is de-energized by operation of the time delay relay 50, whereby to control the length of travel of the transverse conveyor belt 40. It will be here noted, that the control apparatus for the lifter motor 30 also controls another switch 51 which de-energizes the infeed conveyor motor 25 during operation of the lifter motor 30 and transverse conveyor motor 44.

Deenergization of the lifter operating motor 30 causes the secondary conveyor motor 25 to be re-energized to feed another container 11 to the lifter 26 and the cycle is repeated until a row of containers 11 accumulates adjacent the inlet end of the roller bed 5, all of the containers 11 being spaced apart substantially one inch on the conveyor belt 40. As the leading container 11 on the transverse conveyor 4 approaches its limits of travel on the transverse conveyor 4, it engages the sensing finger 52 of a switch 54 which opens the circuit for the lifter motor 30 and closes another circuit through the transverse feed conveyor motor 44 to cause operation of the same to move the packages 11 until the leading one thereof engages the sensing finger 54 of a switch 55. Operation of the switch 55 de-energizes the transverse feed conveyor motor 44 and energizes an inlet feeding or pusher motor 56. The motor 56 is suitable mounted on a wall portion or support member 57 below a pair of laterally spaced brackets 58 mounted on the frame structure 28 adjacent the inlet end of the roller bed 5, see FIGS. 3 and 7. A transverse pusher bar or the like 59 is provided with spaced slide members 60 contained between guide-forming flanges 61 in the tops of the brackets 58 whereby to mount the pusher bar 59 for movements in opposite directions longitudinally of the roller bed 5. A sprocket wheel 62, mounted fast on the output or drive shaft 63 of the motor 56, has entrained thereover an endless link drive chain 64 that runs over a second sprocket wheel 65 mounted fast on a crankshaft 66 that extends transversely of the roller bed 5, and which is journalled in bearings or the like 67 mounted fast on the brackets 58. A pair of cranks 68 are rigidly secured to and extend radially outwardly from opposite ends of the crankshaft 66, and are pivotally connected at their radially outer ends each to one end of a different one of a pair of pitman arms 69, the other ends of which are pivotally connected to opposite end portions of the pusher bar 59, as indicated at 70, see particularly FIGS. 3 and 7.

Figure 3:
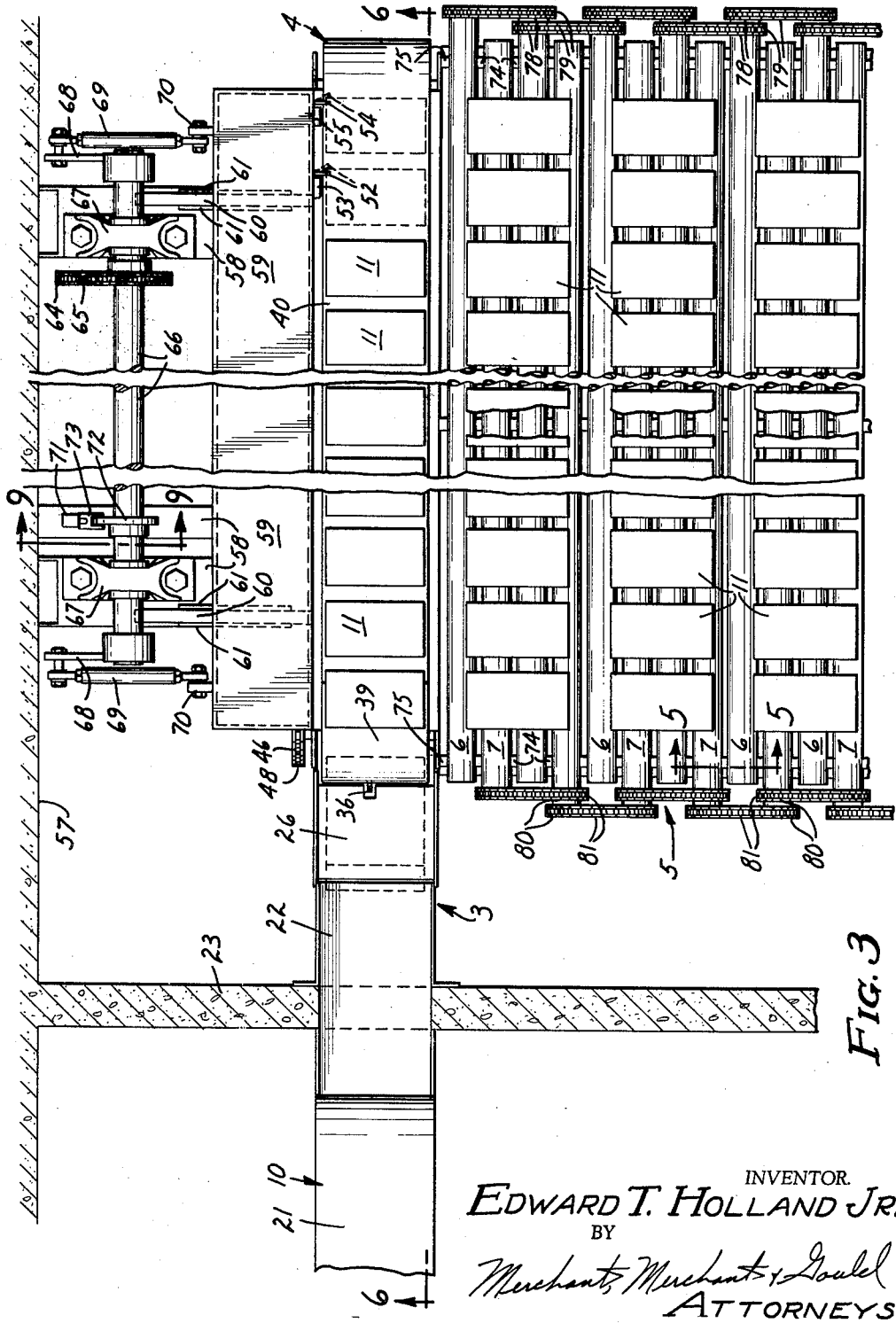
FIG. 3 is an enlarged fragmentary view in plan of the infeed means and inlet end portion of the roller bed conveyor.
Figure 11:
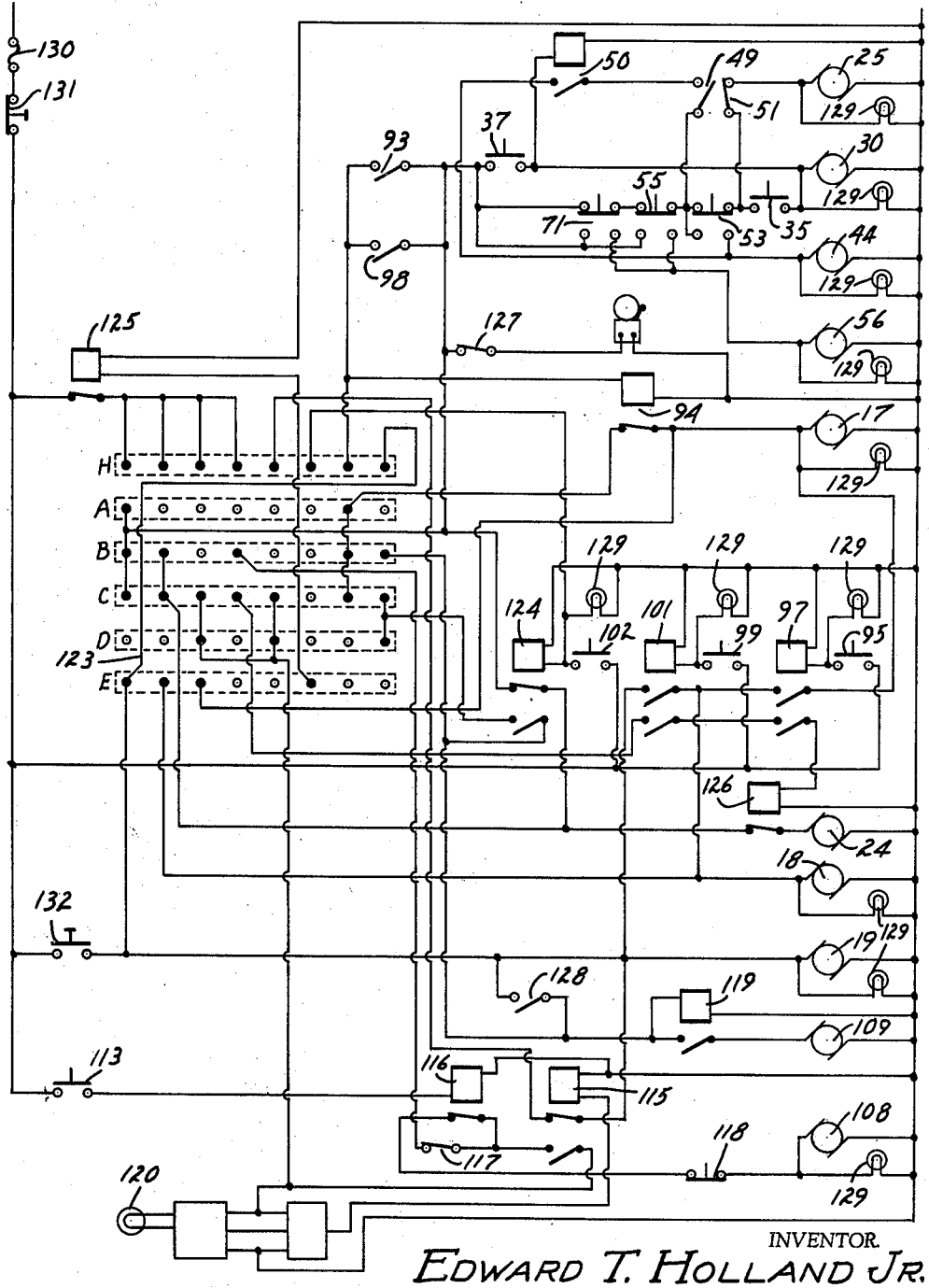
FIG. 11 is a schematic diagram of the electrical circuits attached to the control panel and the numerous devices for controlling movement of the product.

The pusher motor 56 is controlled by means including the above mentioned switch 55 and a cycle switch 71 that is operated by a cam 72 fast on the shaft 66, by means of a cam follower 73, see FIGS. 3, 9, and 11. As above indicated, the switch 55 energizes the motor 56 and the cam operated switch 71 is a holding switch which operates to deenergize the motor 56 upon completion of a single revolution of the shaft 66, the shaft 66 requiring one revolution to advance and retract the pusher bar 59. Advancing movement of the pusher bar 59 causes the same to move the row of packages 11 from the transverse conveyor 4 on to the inlet end of the roller bed conveyor 5, and subsequent retracting movement of the pusher bar 59 causes the same to assume its full line position of FIG. 3 out of the path of movement of subsequent packages 11 deposited on the conveyor belt 40 by the lifter 26.

The rollers 6 and 7 of the roller bed 5 are horizontally disposed, and are of substantial length, which length may be twenty feet or more, and disposed on spaced parallel axes extending transversely of the roller bed 5, the rollers being disposed in closely spaced relationship. It will be noted that the rollers 6 and 7 are disposed in alternating relationship throughout the length of the roller bed 5.

A feature of the instant invention resides in the bearings which journal the rollers 6 and 7, the bearings being shown best in FIGS. 4, 5, 7 and 8, and indicated at 74 and 75. The bearings 74 and 75 are disposed adjacent the ends of the rollers 6 and 7 and, as shown in FIG. 3, intermediate the ends of the rollers 6 and 7 to support the rollers at their longitudinally central portions. The bearings 74 and 75 are rigidly secured to the underlying frame structure 28 by nut-equipped bolts or the like 76, the bearings 74 each having oppositely disposed arcuate bearing surfaces 77 which engage lower and side peripheral surface portions of adjacent rollers 6 and 7. As shown in FIGS. 7 and 8, the bearings 75 at opposite ends of the roller bed 5 have but one bearing surface 77, adjacent ones of said bearings 74 and 75 cooperating to form cradles for the rollers 6 and 7 disposed therebetween. It will be noted that the upper ends of the several bearings 74 and 75 are disposed above the horizontal plane of the axes of the rollers 6 and 7 and below a horizontal plane defined by the top surface portions of the rollers 6 and 7, whereby to prevent upward movement of the several rollers and to permit unobstructed movement of the packages or containers 11 thereover. The bearings 74 and 75 may be made from any suitable bearing material but, for the purpose of the present example, are preferably made from nylon or like synthetic plastic material.

With reference particularly to FIG. 3, it will be seen that the rollers 6 extend outwardly from one side of the frame structure 28 a greater distance than do the alternate rollers 7, and that the rollers 7 extend laterally outwardly from the opposite side of the frame structure 28 a greater distance than do the rollers 6. The rollers 6 are provided with aligned double sprockets 78 on their extended end portions, and endless link chains 79 are entrained over alternating pairs of the sprockets 78 to interconnect the rollers 6 in alternating pairs. In like manner, at the opposite side of the supporting frame 28, the rollers 7 are provided with aligned double sprockets 80 on their extended end portions, and endless link chains 81 are entrained over alternating pairs of the sprockets 80 to interconnect the rollers 7 in alternating pairs. Thus, all of the rollers 6 of each roller bed conveyor section X, Y, and Z are interconnected for common rotation, as are the rollers 7 of each section X, Y, and Z, there being no driving connection between the rollers of one section and the rollers of an adjacent section, each section being driven by its respective drive motor 17, 18 and 19, as above stated.

Figure 4:
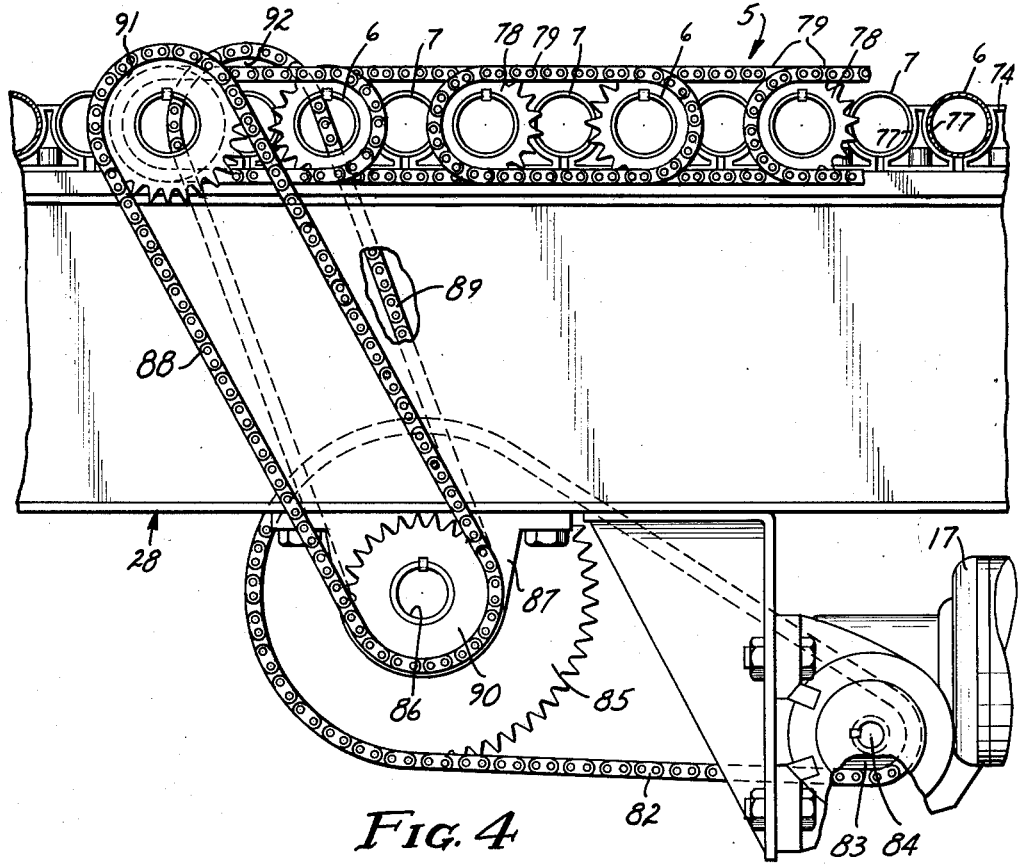
FIG. 4 is a still further enlarged fragmentary view in side elevation of one of the drive mechanisms for the roller bed conveyor.
Figure 5:
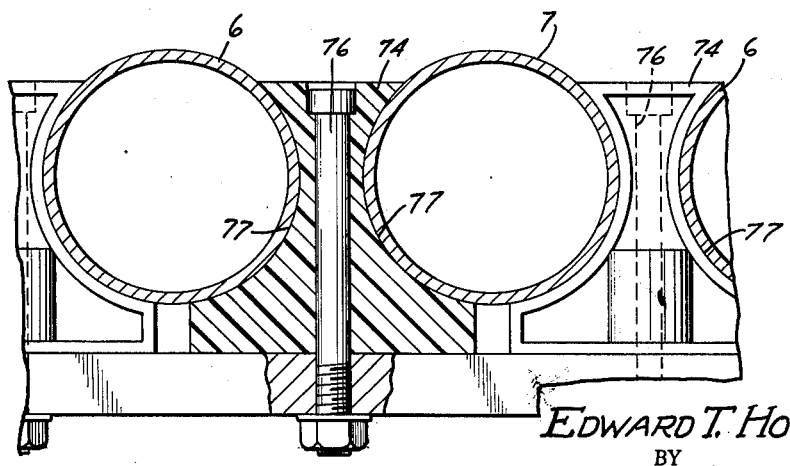
FIG. 5 is an enlarged fragmentary view in section taken substantially on the line 5—5 of FIG. 3.

The driving connections between the motors 17, 18 and 19 and their respective roller bed sections X, Y, and Z are identical, one thereof being shown in FIG. 4. A primary drive chain 82 is entrained over a sprocket wheel 83 fast on the output shaft 84 of the motor 17 and over a second sprocket 85, keyed or otherwise rigidly secured to a jackshaft 86 that extends transversely of the frame structure 28 and that is journaled in bearings 87, one of which is shown. A pair of secondary chains 88 and 89 are entrained over sprocket wheels 90 at opposite ends of the jackshaft 86, the chain 88 being also entrained over a sprocket wheel 91 fast on the adjacent end of one of the rollers 6, the chain 89 being also entrained over a sprocket wheel 92 rigidly secured to an adjacent end of one of the rollers 7. It will be noted that only one of the sprocket wheels 90 is shown in FIG. 4, the other, not shown, being disposed at the opposite side of the frame structure 28.

Operation of the drive motor 17 for the roller bed conveyor section X is controlled in part by the switch 55, a switch 93 controlled by a conventional starter mechanism, not shown, for the infeed or pusher motor 56, and a time relay relay 94 to cause a row of containers 11 fed thereto by the transfer or pusher bar 59 to be conveyed a distance equal to the width or dimension of the containers 11 in a direction longitudinally of the roller bed conveyor plus a predetermined distance of, for example, three inches, the motor 17 then being de-energized. Operation of the drive motor 18 for the intermediate roller bed conveyor section Y is controlled by a switch 95 disposed at one side of the supporting frame 28 and having a container-engaging switch-operating sensing finger 96. The switch 95 is interposed in a circuit involving a control relay 97, the motor 18 being controlled by said relay 97, the time delay relay 94, and a switch 98 that is controlled by the starter mechanism, not shown, for the drive motor 17.

Operation of the drive motor 19 for the roller bed conveyor section Z is controlled by a switch 99 operated by a sensing finger 100 that is normally disposed in the path of travel of containers 11 at the discharge end portion of the roller bed conveyor section Y. The switch 99 is interposed in a circuit containing a control relay 101, said relay 101 directly controlling operation of the motor 19 through a circuit involving the time delay relay 94 and either of the motor-starter controlled switches 93 or 98. Under some operating conditions the switches 95 and 99 are used to deenergize the motors 17 and 18 respectively. In like manner, the motor 19 is, under predetermined operating conditions, deenergized by a switch 102 similar to the switches 95 and 99 and having a container-engaging switch-operating sensing finger 103.

The discharge conveyor 8 includes an endless conveyor belt 104 that is entrained over spaced rollers 105 journalled in a frame 106 that is pivotally mounted to the frame structure 28 at the discharge end of the roller bed conveyor 5 on a horizontal axis extending transversely of the roller bed conveyor 5, as indicated at 107, for swinging movements between a container receiving position shown by full line in FIGS. 2 and 8, and a generally horizontally disposed container discharge position indicated by dotted lines in FIGS. 2 and 8, and as shown in FIG. 1.

The conveyor belt 104 is driven in a direction to deliver the containers 11 discharged thereto from the roller bed conveyor section Z to the roller equipped chute 9 by a motor 108. Means for moving the discharge conveyor 8 between its container receiving and delivery positions includes a positioning motor 109 mounted on the end wall 15, a crank 110 driven by the motor 109, and a pitman arm 111 pivotally connected at one end to the outer end of the crank 110, and at its other end to a bracket 112 on the frame 106.

The discharge conveyor motor 108 is controlled in part by a normally open switch 113 mounted on the delivery chute 9 and operated by a sensing finger or the like 114 that is normally disposed in the path of movement of containers 11 on the discharge chute 9, one of a pair of time-delay relays 115 and 116, a motor starter operated switch 117 operatively associated with the motor 19, and a normally closed switch 118 that may be assumed to be operatively connected to the positioning mechanism of the discharge conveyor 8 and being in a closed condition only when the discharge conveyor 8 is in its generally horizontally disposed container discharge position, as shown by dotted lines in FIGS. 2 and 8. The positioning motor 109 is controlled in part by a time delay relay 119 and other control elements hereinafter to be described. As a safety feature, a light source, such as a lamp 120, is mounted longitudinally outwardly of one end of the discharge conveyor 8 for directing a beam of light longitudinally of the path of movement of containers 11 on the discharge conveyor belt 104. At the opposite end of the conveyor 8 is mounted a photo-electric cell 121 that is included in a conventional circuit, not shown, for maintaining the motors 19 and 109 de-energized as long as packages remain on the discharge conveyor belt 104 to interrupt the beam of light from the lamp 120, or when the lamp 120 is not in operation.

With reference to FIG. 11, a programming switch is indicated diagrammatically as comprising a plurality of contact plates or wafers H, A, B, C, D and E, each of said plates having a plurality of electrical contacts thereon. The contacts of the plate H are adapted to make connection with respective contacts on each of the plates A–E responsive to setting of a control knob 122 on the control panel 20, through the medium of switch connector elements not shown. The programming switch is one of several commercially available types, and in and of itself does not comprise the instant invention. Hence, for the sake of brevity, detailed showing and description of the switch mechanism is omitted. It will be noted, that the inactive contacts on the several contact plates H and A–E are represented by circles, whereas the active contacts, to which circuit leads are connected, are represented by enlarged dots. It will be further noted that in the "off" position of the control knob 122, the contacts of the plate H are mechanically disconnected from the contacts of the several contact plates or wafers A–E, with the exception of one contact of the plate H that is permanently connected to one of the contacts on the plate or wafer E, as shown by a lead 123. Other elements of the control system include control relays 124, 125 and 126, and motor starter controlled switches 127 and 128, the former being operated by the starter mechanism, not shown, for the motor 24 and the latter being associated with the motor starter, not shown, for the motor 109. A plurality of pilot lights 129 are mounted on the control panel 20 to indicate location of containers 11 on the roller bed 5, and to indicate operation of the several motors and various ones of the control elements of the system. As shown, in FIG. 11, individual ones of the pilot lights 129 are arranged in parallel circuits with respective ones of the motors 17, 18, 19, 25, 20, 44, 56 and 108, and control relays 97, 101 and 124. The pilot lights 129 associated with the control relays 97, 101 and 124 become energized when respective ones of the roller bed sections X, Y and Z become filled with containers 11 and will be deenergized after the last row of containers 11 is moved off of its respective bed section, to indicate an empty bed section or one that is not filled. The circuit is fused, as indicated at 130, and provided with an emergency cut-off switch 131 and a normally open manually operated momentary contact switch 132 to energize the motor 19 under special circumstances when it is not desired to set up an operational program for the entire system.

As above indicated, the control knob 122 may be set in various positions to initiate different operational programs, now to be described:

With the control knob 122 set at "feed," see FIG. 10, the contacts of the plate or wafer H are connected to respective ones of the contacts on the plate A. This setting of the control knob 122 closes a circuit for the primary infeed motor 24 through the normally closed switches of relays 126, 124 and 125. Likewise, the secondary infeed motor 25 is energized through a circuit involving switch 51, limit switches 53, 55 and 71, and the normally closed switch of control relay 125. The lifter motor 30 is contained in a circuit involving switches 35, 53, 55, 71 and the normally closed switch of control relay 125, the lifter motor 30 being energized by closing of the switch 35, and held energized by subsequent closing of switch 37. The transverse conveyor motor 44 is contained in a circuit including switches 53, 55, 71 and the normally closed switch of control relay 125, and is energized by movement of the movable contact of switch 53 from the upper stationary contact to the lower ones thereof, of FIG. 11. It will be noted that closing of switches 35 and 37, and switch 49 responsive to energization of the motor 30, energizes the time delay relay 50 to close its switch to maintain the motor 44 energized for the time necessary to move the container 11 a distance equal to its width plus one inch.

The pusher motor 56 and its operation has been heretofore described, as has been that of the motor 17 for the first roller bed section X. When a sufficient number of rows of containers 11 have accumulated on the first bed section X, one of the packages or containers 11 of the first row thereof engages the fencing element 96 to close switch 95 thereby energizing the control relay 97 to close the switches thereof, one of the switches of relay 97 being interposed in the circuit for the motor 18 of the second roller bed section Y, this circuit comprising the normally closed switch of the time delay relay 94, switch 98 and the normally closed switch of control relay 125. Here again the time delay relay 94 controls the length of operation of the drive motor 18 to maintain proper spacing between the rows of containers 11 in the same manner that it controlled operation of the drive motor 17.

When the second roller bed section Y becomes filled with containers or packages 11, one of said containers engages the sensing element 100 of switch 99 to close the switch 99, causing energization of control relay 101 and a closing of the normally open switches thereof. The drive motor 19 then becomes energized through one of the closed switches of relay 101, one of the closed switches of relay 97, the normally closed switch of time delay relay 94, one of the switches 93 and 98, and the normally closed switch of control relay 125. The motor 19 is deenergized by opening of the switch of the time delay relay 94 and, like the motors 18 and 17, reenergized by closing of one or the other of the switches 93 and 98 and closing of the switch of time delay relay 94. Thus, the motors 17, 18 and 19 are intermittently operated until one of the containers 11 in the first row thereof engages the sensing element 103 to close the limit switch 102 causing the control relay 124 to be energized. One of the switches of the control relay 124 opens responsive to relay energization to break the circuit of the infeed motor 24 to deenergize the same and prevent further packages from being fed to the lifter mechanism. Inasmuch as operation of the system is dependent upon packages or containers 11 being fed to the lifter mechanism, such operation of the system ceases, with the entire bed being filled with containers or packages 11, until another program is selected or the manual switch 132 is closed to cause unloading of the bed.

Movement of the control knob 122 to cause connection of the contacts of contact plate H with respective contacts of the contact plate B initiates a surplus feed-discharge program. This program allows continued loading when the bed is full of containers, the operation being governed by production speed and requiring attention at the delivery end of the discharge chute 9 to prevent the containers from accumulating thereon. As one row of containers is fed on to the roller bed from the transverse conveyor 4, a row of containers is fed from the discharge end of the roller bed 5 to the discharge conveyor 8. The system operates in the same manner as above described with reference to the "feed" program, except that it is not shut down when the conveyor bed becomes filled. Under the surplus feed-discharge program, the infeed, lifter, transverse-conveyor and pusher mechanism will continue to operate in their proper sequence to cause delivery of another row of containers or packages 11 to the roller bed, and the roller bed operating motors 17, 18 and 19 will operate to advance the containers 11 thereon, and the first row of containers on the conveyor bed section Z will be moved toward the discharge conveyor 8. Simultaneously, the time delay relay 119 is energized to cause energization of the motor 109 through a circuit involving closed switches of the control relays 101 and 97, the closed switch of time delay relay 94, and one or both of the switches 93 and 98. The motors 19 and 109 are so timed that, when the discharge conveyor belt 104 is in its tilted position of FIG. 8, the first row of packages or containers 11 will fall thereon from the third conveyor bed section Z, whereupon the discharge conveyor 8 will move to its operative position shown by dotted lines in FIG. 8. During this movement of the discharge conveyor 8, the switch 118 will be open, and when the discharge conveyor 8 reaches its operative position shown by dotted lines in FIG. 8, it will mechanically close the switch 118 to energize the discharge conveyor motor 108. The motor 108 and switch 118 are connected in series in a circuit including the normally closed switch of time delay relay 116 and the motor controller operated switch 117 for the roller bed section drive motor 19.

Continued operation of the motor 108 to cause discharge of all of the containers 11 on the discharge conveyor 104 to the discharge chute 9, is contingent on movement of all of the containers 11 past the sensing finger 114 of the switch 113. The time delay relay 116 is so constructed that momentary closing of the switch 113 by a container in its normal movement on the discharge chute 9 will not cause opening of the switch associated with the relay 116. However, should packages or containers 11 accumulate on the discharge chute 9 to a point wherein one of the containers is held at a position where it holds the switch 113 closed for a predetermined time interval, the switch of the time delay relay 116 will open, deenergizing the discharge motor 108. Then, as packages are removed from the delivery chute 9, permitting the switch 113 to re-open, the switch of relay 116 will again close, permitting the discharge motor 108 to operate until all of the packages or containers 11 are removed from the discharge conveyor belt 104. As above indicated, the photoelectric cell controlled apparatus, not shown, will prevent the system ahead of the discharge conveyor from operating until the discharge conveyor 8 is emptied.

Movement of the control knob 122 to a position wherein the contacts of contact plate H engage respective contacts on the contact plate C initiates an automatic feed-discharge program. This arrangement permits automatic feeding of containers 11 to the roller bed 5 and discharge of packages or containers 11 therefrom when one or more of the roller bed sections X, Y, or Z are empty or only partially filled. With this programming, the first roller bed section will operate as if the control knob were set to the "feed" program and the last roller bed section Z will operate as if the control knob 122 were set on the "surplus feed-discharge" program. As soon as the first bed section X is filled, closing of the limit switch 95 will cause the second bed section Y to operate as above described in connection with the "feed" and "surplus feed-discharge" programs. In the event that, when the automatic feed-discharge program is initiated, the central bed section Y is empty, it will not operate until containers 11 are fed thereto by the first bed section. Hence, it will be seen that the automatic feed-discharge program eliminates unnecessary running of non-used portions of the roller bed. Otherwise, this program causes the system to operate in substantially the same manner as above described in connection with the surplus feed-discharge program.

When it is desired to empty the roller bed 5 of all packages or containers 11 thereon, without unnecessarily operating non-used mechanism, such as the infeed, lifter, transverse conveyor and pusher mechanisms, the control knob 122 is manipulated to cause connection between the contacts of contact plate H with respective contacts of the contact plate D. This setting of the control knob 122 initiates a "discharge" program in which only the roller bed operating motors 17, 18 and 19, and motors 108 and 109 are utilized. These motors operate in the manner above described in connection with the "surplus feed-discharge" program and, as each bed section X, Y and Z become emptied, their respective drive motors 17, 18 and 19 are deenergized, as is the discharge conveyor motor 108 when the discharge conveyor belt 104 is emptied.

When a plurality of containers 11 less than the number required to completely fill the roller bed 5 is delivered to the roller bed, it is sometimes desired that the containers be advanced to the delivery end portion of the roller bed 5 for storage. For this purpose, and to eliminate unnecessary operation of the infeed, lifter, transverse conveyor and pusher mechanisms, the control knob 122 is positioned so that the contacts of contact plate H make connection with respective contacts on the contact plate E, to initiate an "advance" program. With this setting of the control knob 122, the roller bed drive motors 17, 18 and 19, will operate continuously until a container 11 of the first row thereof closes the limit switch 102, thereby energizing control relay 125 to cause immediate opening of its normally closed switch to deenergize the motors 17, 18 and 19.

My invention has been thoroughly tested and found to be completely satisfactory for the accomplishment of the objectives set forth; and, while I have shown and described a commercial embodiment of my roller bed conveyor and controls therefor, it will be understood that the same is capable of modification without departure from the spirit and scope of the invention, as defined in the claims.

What I claim is:

1. In a storage and conveying system,
 (a) a frame structure,
 (b) a storage and conveyor bed having opposite inlet and outlet ends and comprising a plurality of aligned conveyor bed sections in tandem relationship,
 (c) each of said sections including a plurality of elongated horizontally disposed conveyor rollers extending transversely of said frame structure,
 (d) bearing means on said frame structure journalling said rollers at axially spaced portions thereof and on spaced parallel axes,
 (e) inlet feeding means including a transverse conveyor element extending transversely of the inlet end of said conveyor bed and a transfer element for feeding transversely extending rows of articles from the transverse conveyor element to the inlet end of said conveyor belt in succession,
 (f) control means including an article engaging conrol element adjacent said transverse conveyor and operative to control said transverse conveyor to cause articles delivered thereto to be disposed in predetermined spaced relationship on said transverse conveyor, (g) independent drive means for each of said conveyor bed sections for imparting rotary movement to the rollers of their respective sections, (h) and control means for independently controlling each of said independent drive means and including control mechanism for controlling said section adjacent said inlet feeding means to disposed said rows of articles in predetermined spaced relationship longitudinally of said conveyor bed.

2. The storage and conveyor bed system of claim 1 in which each of said rollers has an article engaging cylindrical surface of uniform diameter extending substantially the entire length thereof, said bearing means comprising a plurality of bearing elements engaging said cylindrical surfaces of the rollers, said bearing elements having arcuate surface which engage the lower and side surface portions of said cylindrical surfaces of adjacent ones of said rollers to a level above the horizontal plane of the axes of said rollers and below the level of the tops of said rollers, adjacent ones of said bearing elements cooperating to form cradles for the rollers therebetween and terminating at their upper ends below the level of the tops of said rollers, whereby to permit articles on said rollers to pass freely over said bearing elements.

3. The structure defined in claim 1 in which said control means includes a plurality of control elements each operatively associated with a different one of said conveyor bed sections and responsive to predetermined movement of articles thereon to control operation of a succeeding bed section, one of said control elements controlling discharge of articles from the conveyor bed section adjacent the discharge end of said conveyor bed.

4. The structure defined in claim 1 in which said control means includes a multi-position programming switch for controlling operation of said inlet feeding means and said conveyor bed sections in accordance with a plurality of desired operating conditions, said switch having a control device and switch elements operative in one position of said control device to initiate operation of the drive means for said conveyor bed section, and for initiating operation of said inlet feeding means, said switch having switch elements operative in another position of said control device for initiating operation of said drive means independently of said inlet feeding means.

5. The structure defined in claim 4 in which said programming switch includes switch elements operative responsive to positioning of said control device for initiating operation of said drive means and inlet feeding means, said control means including control elements for de-energizing said drive means and inlet feeding means responsive to movement of articles on said conveyor bed to the discharge end thereof, whereby to permit storage of articles on said conveyor bed.

6. In a storage and conveying system, (a) a frame structure, (b) a storage and conveyor bed having opposite inlet and discharge ends and comprising a plurality of elongated horizontally disposed conveyor rollers extending transversely of said frame structure, (c) bearing means on said frame structure journalling said rollers at axially spaced portions thereof on spaced parallel axes, (d) drive motor means for imparting rotary movement to said rollers, (e) inlet feeding means including a transverse conveyor extending transversely of the inlet end of said conveyor bed, a motor for driving said transverse conveyor and delivery means for delivering articles in succession to said transverse conveyor, (f) control means for said motor including a switch and a time delay device for initiating operation of said transverse conveyor responsive to delivery of an article thereto by said delivery means to move said article thereon a distance slightly greater than the width of one of said articles, whereby successive articles delivered to said transverse conveyor are disposed thereon in spaced apart relationship, (g) transfer means including a motor for transferring a row of said articles from said transverse conveyor to said conveyor bed, (h) control means including a second switch and an article sensing element therefor adjacent said transverse conveyor for controlling operation of said transfer device responsive to reception of a predetermined number of articles in said spaced apart relationship on said transverse conveyor, (i) and control means for said roller drive motor including a third switch and an article engaging sensing element and a time delay device for energizing said roller drive motor responsive to delivery of a row of articles thereto by said transfer device and for an interval sufficient to move said row of articles longitudinally of said conveyor bed a distance slightly greater than the dimension of said row longitudinally of said conveyor bed.

7. In a storage and conveying system, (a) a frame structure, (b) a storage and conveyor bed having opposite inlet and discharge ends and comprising a plurality of aligned conveyor bed sections in tandem relationship, (c) each of said sections including a plurality of elongated horizontally disposed conveyor rollers extending transversely of said frame structure, (d) bearing means on said frame structure journaling said rollers at their opposite end portions on spaced parallel axes, (e) independent drive motor means for each of said sections for imparting rotary movement to the rollers of their respective sections, (f) inlet feeding means including a transverse conveyor extending transversely of the inlet end of said conveyor bed, a motor for driving said transverse conveyor, and delivery means for delivering articles in succession to said transverse conveyor, (g) control means for said motor including a switch and a time delay device for initiating operation of said transverse conveyor responsive to delivery of an article thereto by said delivery means to move said article thereon a distance slightly greater than the width of one of said articles, whereby successive articles delivered to said transverse conveyor are disposed thereon in spaced apart relationship, (h) transfer means including a motor for transferring a row of said articles from said transverse conveyor to the adjacent section of said conveyor bed, (i) control means including a second switch and an article sensing element therefor adjacent said transverse conveyor for controlling operation of said transfer device responsive to reception of a predetermined number of articles in said spaced apart relationship on said transverse conveyor, (j) control means for the roller drive motor of said adjacent roller bed section including a third switch and an article sensing element therefor and a time delay device for energizing said last mentioned roller drive motor responsive to delivery of a row of articles thereto by said transfer device and for an interval sufficient to move said row of articles longitudinally of said conveyor bed a distance slightly greater than the dimension of said row longitudinally of said conveyor bed, (k) and control means for each of the others of said roller drive motors including a plurality of article engaging control elements each operatively associated with a different one of said conveyor bed sections and each responsive to predetermined movement of articles thereon to control operation of a succeeding bed section.

8. The storage and conveying system of claim 7 further characterized by a discharge conveyor at the discharge end of said conveyor bed, and drive means for said discharge conveyor, one of said control elements being disposed to control discharge of articles from the conveyor bed section adjacent the discharge end of said conveyor bed to said discharge conveyor.

References Cited by the Examiner

UNITED STATES PATENTS

| | | | |
|---|---|---|---|
| 1,632,750 | 6/27 | Vance | 198—127 |
| 2,024,675 | 12/35 | Worrall | 198—34 X |
| 2,050,012 | 8/36 | Meyer | 198—127 |
| 2,685,176 | 8/54 | Berch et al. | 198—31 X |
| 2,701,049 | 2/55 | Kendall et al. | 198—127 |
| 2,812,050 | 11/57 | Amerio et al. | 198—24 X |
| 2,837,199 | 6/58 | Ladewig | 198—24 X |
| 2,973,093 | 2/61 | Erickson | 198—127 X |
| 3,010,593 | 11/61 | Adams et al. | 198—40 X |
| 3,066,788 | 12/62 | Christiansen | 198—127 X |

SAMUEL F. COLEMAN, *Primary Examiner.*

WILLIAM B. LA BORDE, *Examiner.*